Oct. 14, 1941.                G. A. MITCHELL                2,258,903
              VARIABLE FOCUS SYSTEM FOR OPTICAL INSTRUMENTS
                   Filed Aug. 7, 1939          2 Sheets-Sheet 1
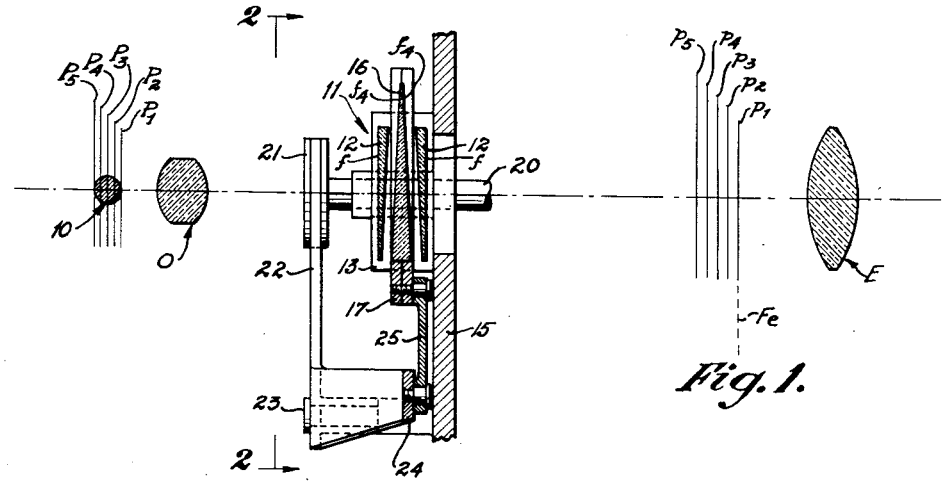
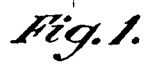
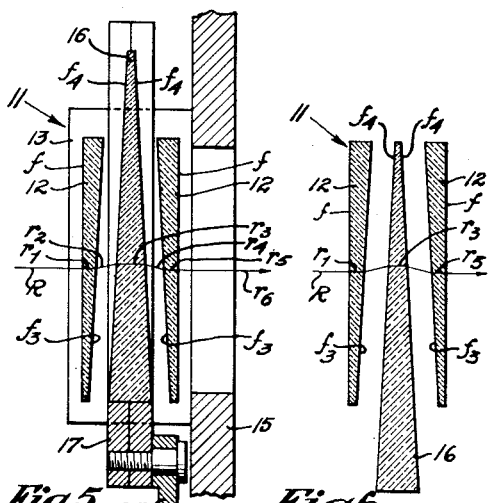
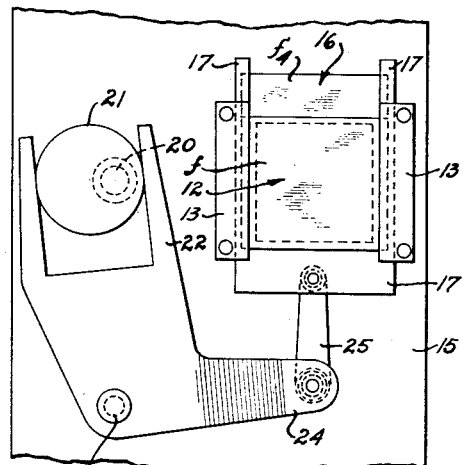
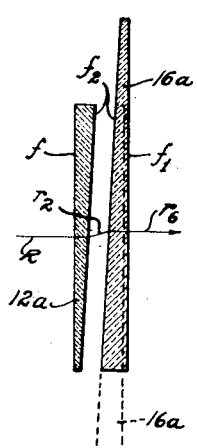
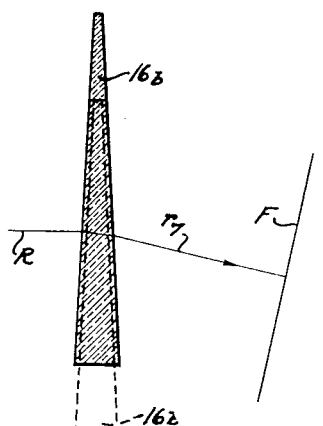
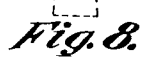
Inventor.
George A. Mitchell.
Attorney.

Patented Oct. 14, 1941

2,258,903

UNITED STATES PATENT OFFICE 2,258,903

VARIABLE FOCUS SYSTEM FOR OPTICAL INSTRUMENTS

George A. Mitchell, Pasadena, Calif.

Application August 7, 1939, Serial No. 288,798

4 Claims. (Cl. 88—1)

This invention relates to optical instruments of the type of which cameras and microscopes are typical, that is, optical instruments in or by which a three dimensional object or field is viewed, and the resulting image is either observed or is recorded photographically.

A primary object of the invention is to provide a simple system and apparatus which may be applied to such instruments for the purpose of changing the focal planes during observation or photographic exposure, to the end of producing an image or photographic record having greater depth along the optical axis than is the case in the usual use of such instruments. It is also an object of the invention to provide a system and apparatus of such form and optical effect that variation of the position of the focal planes does not change the size of the resultant optical image.

I am well aware that several proposals have been made in the past to achieve the general object of varying the positions of the focal planes for the general purpose of obtaining depth in the image, but all such prior proposals of which I am aware have involved operations and apparatus which are either complicated or large or unwieldly. For instance, it has been proposed among other things to shift the whole instrument periodically along its optical axis, or to shift the objective lens periodically along the optical axis. Such operations as these involve relatively rapid movement of comparatively large masses, resulting in the enforced use of relatively heavy operating mechanisms and the setting up of objectionable vibration. Furthermore, any such shift of the instrument or lens involves an accompanying change of size of the image; and in order to overcome that objectionable feature it has been found necessary to utilize other cooperating movements of parts of the optical system, all of which introduces complications.

I have overcome the objectionable features inherent in the prior art by my present invention. According to my invention I provide a wedge prism or set of wedge prisms in the optical train behind the objective lens and preferably immediately in front of the interior focal plane or film, movable in such manner as to vary the length of the light path in glass, in proportion to the length of the air, and thereby to vary the position of the image plane in which an image is formed of any fixed point in the field before the objective. Or, conversely stated, the operation results in changing the position of the exterior focal plane, an image of which is formed at a fixed plane behind the wedge prisms. During these changes of focal plane position the focussed image size does not vary.

In such an instrument as a microscope I prefer to vibrate the wedge prism system preferably, although not necessarily, at a periodicity less than the period of visual retention. In a camera, I vibrate the wedge prism system preferably at a speed which will cause the movement of the focal planes throughout the complete desired range during each single photographic exposure, so that a single photograph will contain a composite image made up of images of the object or field at all the desired exterior focal planes. The immediately foregoing may preferably be true both of the making of still photographs and of the making of the succession of still photographs known as motion pictures. If, however, the successive exposures of a motion picture are taken and exhibited at sufficient speed the timing of the operations may be such that successive exposures, in a recurrent cycle, obtain photographic images of the object or field in successively different exterior focal planes. It is only necessary, no matter how fast the film is run, that the cycles of focal plane change succeed each other fast enough for visual retention.

The invention will now be best understood from the following detailed description of certain typical and illustrative forms as applied to such optical instruments as microscope and camera. For the purpose of making my invention clear by way of illustration, I describe the typical and illustrative forms with some detail and particularity, but that is not to be taken as a limitation upon my invention further than the invention is definitely limited by the appended claims. For the purpose of this description I refer to the accompanying drawings in which:

Fig. 1 is a diagram illustrating the application of my invention in such an instrument as a microscope;

Fig. 2 is a diagrammatic view taken as indicated by line 2—2 on Fig. 1;

Fig. 5 is an enlargement of a portion of Fig. 1, showing a preferred form of wedge prism set;

Fig. 6 is a view showing the prisms of Fig. 5 with the movable prism in a different position;

Fig. 7 shows a modified wedge prism set; and

Fig. 8 shows another modified prism arrangement.

Figure 3:
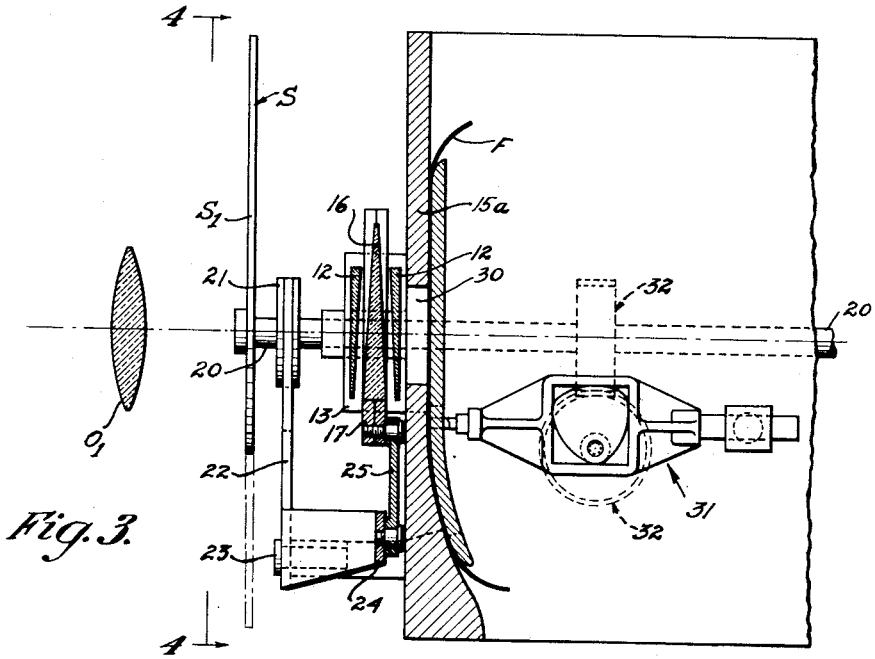
Fig. 3 is a view similar to Fig. 1 but showing the application of my invention to a camera, particularly a motion picture camera.

Referring first to Figs. 1, 2, 5 and 6, I show my system applied to a simple compound microscope. In the diagram the microscope objective is shown at O and the eyepiece at E. The object being viewed is shown at 10, the position of the object with relation to objective O being such that the object is close to but just outside the principal focus of the objective. In the diagram several focal planes, P1 to P5, inclusive, are indicated, intersecting the object 10. It will be understood that in the diagram the size of object 10 and the spacing of the planes P1, etc., are enlarged for purposes of illustration. Corresponding focal planes P1 to P5 inclusive are also shown in Fig. 1 behind objective O, these latter planes being the focal planes which will correspond, respectively, to the exterior focal planes P1 to P5, inclusive, assuming a given amount of glass in the light path between objective O and the posterior focal planes.

The wedge prism set which is shown in Fig. 1, and indicated generally by the numeral 11, is the same as that shown in Figs. 5 and 6. This preferred form of prism set embodies two fixed wedge prisms 12 carried on a suitable mounting 13 which is mounted on any suitable frame portion of the apparatus, such as the frame which is indicated diagrammatically at 15. These two wedge prisms 12 are preferably arranged with their two outer faces f in parallelism, so that their two inner faces f3 converge, in the aspect shown in Figs. 1, 5 and 6. In a plane at right angles to that of the drawings, the elements of the prism outer faces are parallel. Between the two wedge prisms 12 another wedge prism 16 is mounted on a slider 17 which slides in the mounting 13 in a direction parallel to the outer faces f of prisms 12, and with prism 16 equidistantly spaced between the two prisms 12. The two faces f4 of wedge prism 16 are parallel to the two inner faces f3 of prisms 12.

The foregoing described particular relative arrangement of the three prisms is preferred, but not necessary. It is only necessary, to obtain the specifically desirable results of the three prism set, that the set as a whole be optically symmetric with relation to a central plane transverse of the optical axis.

The path of a ray of light passing through the prism set is shown in Figs. 5 and 6. Fig. 5 shows prism 16 in a position where the thicker or base part is interposed between prisms 12, while Fig. 6 shows prism 16 at the other end of its stroke, interposing its thinner part between prisms 12.

In the position shown in Fig. 5 the ray R enters the left-hand or front prism 12 and passes through that prism in a path r1. On emerging from that prism it is refracted away from the normal and passes through air at r2. Then, entering prism 16 its path at r3 through that prism is parallel to the original path R but displaced laterally. On leaving prism 16 the path through air at r4 is refracted again away from the normal and on entering prism 12 the path is refracted toward the normal so that the path at r5 through prism 12, and the final emergence path at r6, are parallel to and identical with the original path R prolonged. The ray R thus emerges from the prism set, after having passed through a certain amount of glass, without any lateral displacement, and that is true for any ray passing through the prism set. Also, any ray passing through the prism set will, in the position of the prism shown in Fig. 5, have a certain linear total of glass passage, indicated in Fig. 5 by the summation of the passages r1, r3 and r5.

In the other position of the prism shown in Fig. 6, due to the fact that the thinner part of prism 16 is interposed, the summation of glass passages r1, r3 and r5 for any ray is less than that in the position of Fig. 5. In any intermediate position of prism 16 the total glass path for any ray lies between the two extremes. The change in the total glass path for all rays passing through the prism set, is proportionate to the respective air paths of the respective rays; so that the proportion of air path to glass path is changed equally for all rays.

The total amount of variation of the glass path, and the accompanying amount of change of position of the focal planes, is governed by the amount of change in position of the focal planes that is desired. For operation in either microscope or motion picture camera, where the focal lengths are comparatively short, the amount of change of focal plane position, and therefore the amount of variation of glass path, is comparatively small. And the amount of variation of glass path may be controlled by either the angularity of the faces of the wedge prisms, or the amount of movement given prism 16, or both. In general, because the amount of change of focal plane position is small, the prism angularity will be small; and also, generally, I prefer to make the prism angularity rather small, say an angle of one or two degrees or thereabouts, so that the prism movement may be linearly large enough that the operating mechanism does not have to be too minute.

Any suitable operating mechanism may be used for prism 16. In Figs. 1 and 2 I have shown an operating shaft 20 which may be rotated by any suitable source of power and at any suitable speed. This shaft carries an eccentric 21 which is engaged by a yoke 22 pivoted at 23. An arm 24, forming a part of or attached to the yoke, is connected at its end by a link 25 to the slider 17 carrying prism 16. The described mechanism, operated by eccentric 21, vibrates prism 16 back and forth between the two extreme positions shown in Figs. 5 and 6.

In Fig. 1 prism 16 is shown in the position of Fig. 5, fully inserted between the two fixed prisms 12, and providing the longest glass path. In this position of the prisms, if the microscope is focussed on external plane P1, the corresponding internal focal plane p1 will coincide with focal plane Fe which is the plane upon which the eye-piece E is focussed. In this position of the parts, the interior focal planes p2, p3, etc., corresponding to exterior focal planes P2, P3, etc., will lie forward of plane Fe. As prism 16 moves from the position shown in Figs. 5 and 1 to the position shown in Fig. 6, the interior focal planes p2, p3, etc., will successively pass rearwardly through plane Fe, and thus the images of the external focal planes P2, P3, etc., will successively come into focus at Fe. And on the reverse motion of prism 16 the interior focal planes will again pass through the focal plane Fe in a reverse direction. The result is that, in a complete cycle of operation of wedge prism 16, an infinite number of focussed images, or an infinite number of exterior planes of the object, pass twice through the focal plane Fe and are observed by the observer.

The speed at which prism 16 is vibrated, and the consequent speed at which the sharp observed images are changed, depends upon what may be desired. If it is desired to obtain a steady unchanging sharp image of the object at any one external plane, prism 16 may be moved to the corresponding requisite position and allowed to remain stationary in that position as long as desired. By so operating, a microscopic object can be observed, in sharp focus, at any selected plane. On the other hand, shaft 20 may be rotated at sufficient speed to vibrate prism 16 fast enough that all of the successive images are passed through the eye-piece focal plane Fe in a time period less than that of visual retention, so that the observer then apparently observes but one image, but that one image is a composite image having depth.

Figure 4:
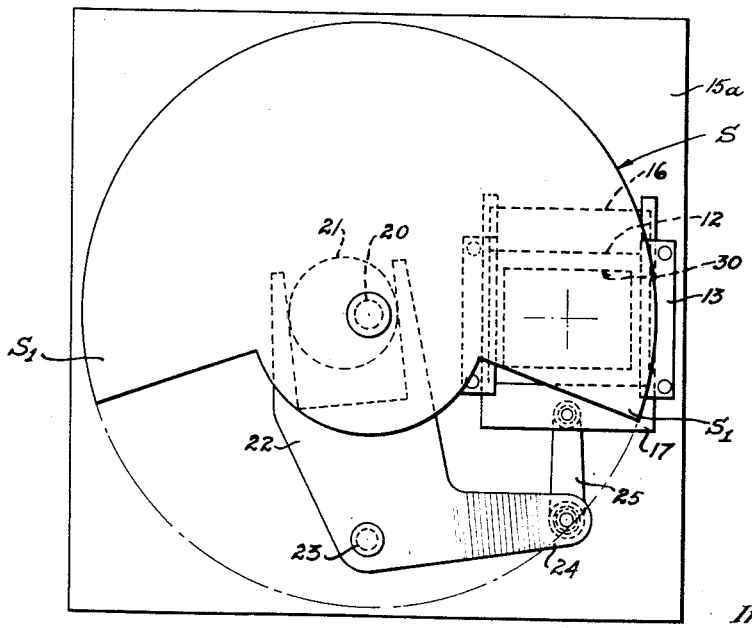
Fig. 4 is a diagram taken as indicated by line 4—4 of Fig. 3.

In Figs. 3 and 4 I show the system applied to a camera, such as a motion picture camera. The various parts in these two figures are essentially the same as shown in Figs. 1 and 2 except that in Figs. 3 and 4 a photographic objective O1 is provided, a revolving shutter S is mounted on the operating shaft 20, the frame 15a is here shown as an aperture plate having an exposure aperture 30, and the film F is intermittently moved behind aperture 30 by a film movement which is shown diagrammatically at 31, operated from shaft 20 by a driving connection indicated generally by the numeral 32. In the present instance the driving connection at 32 may be considered as one which maintains a one to one ratio between shaft 20 and movement 31 so that the shaft 20 and shutter S makes one complete revolution, and wedge prism 16 goes through a complete cycle of movement, for each cycle of film movement 31. In the position of the parts shown in Figs. 3 and 4 the wedge prism 16 is at the end of its stroke, in a position most fully inserted between the fixed prisms 12, and is just ready to start on its stroke toward the relative position shown in Fig. 6. Also in the position shown in Figs. 3 and 4, the opaque part S1 of shutter S has just cut off exposure aperture 30, and movement 31 is just beginning its down stroke to pull film F down by the distance of one frame. During the pull down period of movement 31, shutter S keeps exposure aperture 30 covered. As soon as the pull down movement is completed, the shutter opens the exposure aperture. Assuming, for purpose of simplicity, that the film pull down occupies 180° of rotation of shaft 20, and shutter S keeps aperture 30 covered for that 180°, then at the time when the pull down is completed and exposure aperture 30 opened, wedge prism 16 has reached approximately the position shown in Fig. 6. Then, during the ensuing 180° of shaft rotation, the film remains at rest, exposure aperture 30 open, and prism 16 moves from the position shown in Fig. 6 to the position shown in Fig. 5, and thus changes the total amount of glass path gradually from one extreme to the other while the film is being exposed.

The optical results are the same as has been explained in connection with Fig. 1. In the camera the interior fixed focal plane is a plane of film F. By varying the total amount of glass path during exposure, the different interior focal planes of objective O1, corresponding to the planes $p1$ to $p5$ of Fig. 1, are passed through the plane of film F, and thus each single exposure of the film is made up of a composite of an infinite number of focussed images of different planes of the external object or field. And by properly designing and proportioning the amount of change of the total glass path, consonant with the focal length of objective O1, the location of the external focal planes, corresponding to P1 to P5 of Fig. 1 may be fixed as desired. For instance, those external planes may extend from a close up distance to infinity, or may extend over any lesser chosen range.

Operation such as I have just described results in each frame of film F carrying the full composite image, as described; and thus, the operation as described is one which will be performed to obtain any single still photograph of the whole described composite image. Such a photographic image as thus obtained would contain in itself the desired depth of image. On the other hand, in taking motion pictures, it is not necessary that each separate frame of the motion picture show each and all of the images which go to make up the complete composite image, provided the film is run at sufficient speed that a complete cycle of change of the focal planes takes place within the period of visual retention. Thus, in the system shown in Figs. 3 and 4, the prism vibration might be at a speed slower than the one to one ratio shown, provided the film is run faster.

And also, the ratio of prism and movement speed may be changed in the opposite direction. Instead of moving prism 16 through one stroke for each film exposure, the prism vibrating mechanism may be operated at relatively high speed, so that it makes more than one, or many complete strokes during each exposure period.

As will be well understood by those skilled in the art, the "form" of the movement applied to the vibrating prism may be varied. In the simple eccentric movement which I have described, the motion of the prism is one in which the velocity varies from zero at each end of the movement to a maximum at or near the center of movement. If the film is exposed throughout the prism movement the images of the limiting focal planes $p1$ and $p2$ in the diagrams) will be the longest exposed and therefore most emphasized in the final composite image if the development of all images is uniform. By changing the "form" of the movement, or by changing the relation of exposure period to the period of prism movement, the relative accentuation or prominence of any image or images, or lack of such accentuation, may be controlled. For instance, by restricting the exposure period to the medial parts of the prism movement, even when moved by an eccentric as described, the several images composing the composite may be very nearly uniformly exposed. And finally, the relative densities of the developed images may be to some extent controlled in the developing process.

I may also mention that, in general, it may be desirable to short time the development of the images composing the composite, as by so doing the relatively dense photographic images which are caused by the sharp focus light images are predominantly developed at the expense of the relatively diffuse images that the film receives from focal planes while out of sharp focus.

I have described the prism set of Fig. 5 as being preferred. The reason for that preference is that such an arrangement not only proportionately increases the length of glass path in all light rays passing through the set, but also that the emergent rays are not laterally displaced and color separation is avoided. In certain purposes however the simple two-prism set of Fig. 7, or the still simpler single prism of Fig. 8, may be used. In Fig. 7 the single fixed prism is shown at 12a and the moving prism at 16a. In this case the two wedge faces $f2$ of the prisms are parallel, and the front and rear faces $f$ and $f1$ are parallel. The emergent ray at $r6$ is parallel to the entering R, but laterally offset. There is a slight color dispersion, and that and the amount of lateral offset vary slightly if the prism 16a is moved along a line parallel to the front and rear faces f and f1. However, if the prism 16a is moved along a line parallel to faces f2, so as to keep the air gap at r2 uniform, the lateral displacement and dispersion do not vary. Such a movement is indicated in Fig. 7.

In Fig 8, a single wedge prism 16b is shown. In such an arrangement there is more color dispersion, and the emergent ray at r1 is displaced angularly relative to entering ray R. The film at F, or the equivalent viewing eye-piece, must then be set at a corresponding angle.

I claim:

1. In an optical viewing system having an objective lens which views a three-dimensional field and forms a series of optical images, of axially spaced planes in the field, in image planes spaced along the optical axis of the objective lens in proximity to a fixed viewing plane; variable glass path means for moving said optical images along the optical axis into coincidence with said fixed viewing plane without moving the images laterally concomitantly with their axial movements, said variable glass path means comprising exclusively a wedge prism set including three wedge prisms each disposed across the optical axis between the objective lens and the image planes, said set including two spaced exterior wedge prisms arranged with their tapers in the same direction and an intermediate wedge prism between the two exterior prisms arranged with its taper directed oppositely to that of the two exterior prisms, said prism set being symmetric with relation to a central plane through the intermediate prism and normal to the optical axis, the outer faces of the exterior prisms being normal to the optical axis, and the inner faces of the exterior prisms being parallel to the respective opposed faces of the intermediate prism, and means supporting the prisms in the relative positions herein defined, said means including guiding means allowing, and restricting the prisms to, relative movements between the exterior prisms and the intermediate prism in a plane parallel to one of the defined faces of the prisms.

2. In an optical viewing system having an objective lens which views a three-dimensional field and forms a series of optical images, of axially spaced planes in the field, in image planes spaced along the optical axis of the objective lens in proximity to a fixed viewing plane; variable glass path means for moving said optical images along the optical axis into coincidence with said fixed viewing plane without moving the images laterally concomitantly with their axial movements, said variable glass path means comprising exclusively a wedge prism set including three wedge prisms each disposed across the optical axis between the objective lens and the image planes, said set including two spaced exterior wedge prisms arranged with their tapers in the same direction and an intermediate wedge prism between the two exterior prisms arranged with its taper directed oppositely to that of the two exterior prisms, said prism set being symmetric with relation to a central plane through the intermediate prism and normal to the optical axis, the outer faces of the exterior prisms being normal to the optical axis, and the inner faces of the exterior prisms being parallel to the respective opposed faces of the intermediate prism, and means supporting the prisms in the relative positions herein defined, said means including guiding means allowing, and restricting the prisms to, relative movements between the exterior prisms and the intermediate prism in a plane normal to the optical axis.

3. In an optical viewing system having an objective lens which views a three-dimensional field and forms a series of optical images, of axially spaced planes in the field, in image planes spaced along the optical axis of the objective lens in proximity to a fixed viewing plane; variable glass path means for moving said optical images along the optical axis into coincidence with said fixed viewing plane without moving the images laterally concomitantly with their axial movements, said variable glass path means comprising exclusively a wedge prism set including three wedge prisms each disposed across the optical axis between the objective lens and the image planes, said set including two spaced exterior wedge prisms arranged with their tapers in the same direction and an intermediate wedge prism between the two exterior prisms arranged with its taper directed oppositely to that of the two exterior prisms, said prism set being symmetric with relation to a central plane through the intermediate prism and normal to the optical axis, the outer faces of the exterior prisms being normal to the optical axis, and the inner faces of the exterior prisms being parallel to the respective opposed faces of the intermediate prism, means supporting the prisms in the relative positions herein defined, said means including guiding means allowing, and restricting the prisms to, relative movements between the exterior prisms and the intermediate prism in a plane parallel to one of the defined faces of the prisms, and means for causing relative oscillation of the prisms in the defined plane of movement.

4. In an optical viewing system having an objective lens which views a three-dimensional field and forms a series of optical images, of axially spaced planes in the field, in image planes spaced along the optical axis of the objective lens in proximity to a fixed viewing plane; variable glass path means for moving said optical images along the optical axis into coincidence with said fixed viewing plane without moving the images laterally concomitantly with their axial movements, said variable glass path means comprising exclusively a wedge prism set including three wedge prisms each disposed across the optical axis between the objective lens and the image planes, said set including two spaced exterior wedge prisms arranged with their tapers in the same direction and an intermediate wedge prism between the two exterior prisms arranged with its taper directed oppositely to that of the two exterior prisms, said prism set being symmetric with relation to a central plane through the intermediate prism and normal to the optical axis, the outer faces of the exterior prisms being normal to the optical axis, and the inner faces of the exterior prisms being parallel to the respective opposed faces of the intermediate prism, means supporting the prisms in the relative positions herein defined, said means including guiding means allowing, and restricting the prisms to, relative movements between the exterior prisms and the intermediate prism in a plane normal to the optical axis, and means for causing relative oscillation of the prisms in the defined plane of movement.

GEORGE A. MITCHELL.